United States Patent
Lu et al.

(10) Patent No.: US 11,208,884 B2
(45) Date of Patent: Dec. 28, 2021

(54) ACOUSTIC ARRAY SIGNAL PROCESSING FOR FLOW DETECTION

(71) Applicant: Halliburton Energy Services, Inc., Houston, TX (US)

(72) Inventors: Yinghui Lu, The Woodlands, TX (US); Avinash Vinayak Taware, The Woodlands, TX (US); Paris Smaragdis, Urbana, IL (US); Nam Nguyen, Singapore (SG); David Alan Welsh, League City, TX (US); Clifford Lloyd Macklin, Katy, TX (US); Daniel Viassolo, Katy, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 15/318,322

(22) PCT Filed: Jan. 11, 2016

(86) PCT No.: PCT/US2016/012806
§ 371 (c)(1),
(2) Date: Dec. 12, 2016

(87) PCT Pub. No.: WO2016/115012
PCT Pub. Date: Jul. 21, 2016

(65) Prior Publication Data
US 2017/0321540 A1    Nov. 9, 2017

Related U.S. Application Data

(60) Provisional application No. 62/103,006, filed on Jan. 13, 2015.

(51) Int. Cl.
*E21B 47/10*    (2012.01)
*E21B 47/0224*    (2012.01)
(Continued)

(52) U.S. Cl.
CPC .............. *E21B 47/101* (2013.01); *G01V 1/40* (2013.01); *G01H 17/00* (2013.01)

(58) Field of Classification Search
CPC ......... E21B 47/101; G01V 1/40; G01H 17/00
(Continued)

(56) References Cited

U.S. PATENT DOCUMENTS 4,646,273 A    2/1987 Carlson et al.
4,711,303 A    12/1987 Koeling et al.
(Continued)

FOREIGN PATENT DOCUMENTS

EA    2208039 B1    9/2015
EP    1325358 B1    2/2009
(Continued)

OTHER PUBLICATIONS

"International Application Serial No. PCT/SG2016/050326, International Search Report dated Oct. 18, 2016", 4 pgs.
(Continued)

*Primary Examiner* — Jacques M Saint Surin
(74) *Attorney, Agent, or Firm* — Haynes and Boone, LLP (57) ABSTRACT

Disclosed are tools, systems, and methods for detecting one or more underground acoustic sources and localizing them in depth and radial distance from a wellbore, for example, for the purpose of finding underground fluid flows, such as may result from leaks in the well barriers. In various embodiments, acoustic-source detection and localization are accomplished with an array of at least three acoustic sensors disposed in the wellbore, in conjunction with array signal processing.

20 Claims, 10 Drawing Sheets

(51) Int. Cl.
*G01H 17/00* (2006.01)
*G01V 1/40* (2006.01)
(58) Field of Classification Search
USPC .......................................................... 73/597
See application file for complete search history.

(56) References Cited

U.S. PATENT DOCUMENTS

| | | | |
|---|---|---|---|
| 4,881,207 | A | 11/1989 | Dubesset et al. |
| 6,725,705 | B1 | 4/2004 | Huebler et al. |
| 7,219,762 | B2 | 5/2007 | James et al. |
| 7,464,588 | B2 | 12/2008 | Steinsiek |
| 2002/0064331 | A1* | 5/2002 | Davis ................... E21B 47/102 385/12 |
| 2003/0139884 | A1 | 7/2003 | Blanch et al. |
| 2005/0125170 | A1* | 6/2005 | Gysling ................. G01F 1/666 702/48 |
| 2009/0114472 | A1* | 5/2009 | Winkler ................ E21B 47/082 181/105 |
| 2010/0262373 | A1 | 10/2010 | Khadhraoui et al. |
| 2010/0268489 | A1 | 10/2010 | Lie et al. |
| 2011/0188346 | A1 | 8/2011 | Hull |
| 2011/0199607 | A1 | 8/2011 | Kanellopoulos et al. |
| 2011/0231097 | A1 | 9/2011 | Market |
| 2011/0255077 | A1 | 10/2011 | Rogers |
| 2012/0143515 | A1* | 6/2012 | Norman ............. G01N 33/0073 702/24 |
| 2012/0257475 | A1 | 10/2012 | Luscombe et al. |
| 2013/0167628 | A1 | 7/2013 | Hull et al. |
| 2013/0308424 | A1 | 11/2013 | Kumar |
| 2014/0110124 | A1* | 4/2014 | Goldner .............. E21B 47/1025 166/337 |
| 2016/0258281 | A1* | 9/2016 | Mandal .................. E21B 47/09 |
| 2016/0362972 | A1* | 12/2016 | Dykstra ................ E21B 47/18 |

FOREIGN PATENT DOCUMENTS

| | | |
|---|---|---|
| EP | 2386881 A1 | 11/2011 |
| WO | WO-0149972 A1 | 7/2001 |
| WO | WO-2009048340 A2 | 4/2009 |
| WO | WO-2013008035 A2 | 1/2013 |
| WO | WO-2013045941 A1 | 4/2013 |
| WO | WO-2014004327 A1 | 1/2014 |
| WO | WO-2014100272 A1 | 6/2014 |
| WO | WO 2016/010553 A1 | 1/2016 |
| WO | WO-2016115012 A1 | 7/2016 |
| WO | WO-2016115030 A1 | 7/2016 |
| WO | WO 2016/159959 A1 | 10/2016 |

OTHER PUBLICATIONS

"International Application Serial No. PCT/SG2016/050326, Written Opinion dated Oct. 18, 2016", 5 pgs.

"International Application Serial No. PCT/US2016/012806, International Search Report dated Apr. 8, 2016", 3 pgs.

"International Application Serial No. PCT/US2016/012806, Written Opinion dated Apr. 8, 2016", 7 pgs.

Search Report issued for European Patent Application No. 16737661.5, dated Jun. 4, 2018, 7 pages.

Exam Report issued for European Patent Application No. 16737661.5, dated Apr. 20, 2021, 6 pages.

* cited by examiner

ACOUSTIC ARRAY SIGNAL PROCESSING FOR FLOW DETECTION

CROSS-REFERENCE TO RELATED APPLICATIONS

This application is a U.S. National Stage Filing under 35 U.S.C. 371 of International Patent Application Serial No. PCT/US2016/012806, filed Jan. 11, 2016, which application claims priority to and the benefit of, and incorporates herein by reference in its entirety, U.S. Provisional Patent Application Ser. No. 62/103,006, filed on Jan. 13, 2015 and which are incorporated herein by reference in their entirety.

BACKGROUND

During the life cycle of an oil or gas well, it is desirable to monitor and maintain well integrity. In particular, the integrity of the well barriers (such as the production tubing, the well casing, and the surrounding cement sheath) is important to ensure safe operation of the well and avoid blow-out incidents or leakage of hydrocarbons to the environment. Leaks in the well barriers can in principle be detected based on underground fluid flows (e.g., of oil or gas) in and around a wellbore. Monitoring downhole flows around wellbores, such as injected water, can further be of interest in reservoir characterization. Underground flows generally emit acoustic signals that can be measured, e.g., with fiber cables disposed along the wellbore or with acoustic point sensors such as Fiber Bragg Grating (FBG) sensors or hydrophones. Existing methods are, however, very limited in the accuracy and precision with which they can localize (if at all) a detected flow.

DETAILED DESCRIPTION

Described herein are tools, systems, and methods for detecting one or more underground acoustic sources and localizing them in depth and radial distance from a wellbore, using an array of at least three acoustic sensors disposed in the wellbore in conjunction with array signal processing. (The term "depth" herein generally refers to a coordinate along the direction of the longitudinal axis of a wellbore, regardless whether the wellbore extends vertically into the formation or is tilted with respect to the vertical direction. The term "radial distance" refers to a direction perpendicular to and away from the longitudinal wellbore axis.) Acoustic-source detection and localization in accordance herewith may be employed, in particular, to find underground fluid flows (e.g., resulting from leaks in the well barriers) from which the acoustic signals emanate.

Array signal processing generally refers to techniques for estimating or calculating parameters of one or more signal sources (such as the source locations and emitted waveforms) by fusing data collected by an array of sensors with known geometric relations either substantially simultaneously or, more generally, with known temporal relations between the different sensor signals. "Substantially simultaneously" herein indicates that the time intervals over which signals are collected overlap significantly (e.g., by at least 90%, preferably at least 99%) between the different sensors. Since time shifts between the different sensors due to different travel times of the signal from the source to the sensors are generally small (e.g., on the order of one millisecond) compared to the total signal-collection interval (e.g., on the order of 100 ms), significant overlap in the collection intervals generally ensures that the emission time periods corresponding to the measured signals likewise overlap significantly, facilitating array-signal processing. In the (rare) event that time shifts between the different sensors are significant in comparison to the overall collection interval, they can be compensated for by shifting the collection intervals between the various sensors accordingly so as to ensure that all sensors measure substantially the same emission time period.

Array-signal-processing techniques known in the art include various spatial filtering methods, such as (without limitation) conventional beamforming, Capon's beamforming, Multiple Signal Classification (MUSIC), and various parametric methods, as well as time-delay estimation. Array signal processing generally relies on a forward model of wave propagation from the source(s) to the sensors to solve the inverse problem (e.g., source localization). In traditional application contexts, such as radar and sonar, this forward model is generally straightforward because wave propagation occurs in a uniform (homogenous and isotropic) medium (e.g., air or water) and the source can be assumed, as a practical matter, to be far away from the sensors. When fluid flows in and surrounding a wellbore are to be measured, however, the uniform-medium and far-field assumptions break down. Accordingly, in various embodiments, the forward model is adjusted to account for the configuration and condition of the wellbore and surrounding formation (which collectively include various propagation media and boundaries therebetween) and their effect on the wave field (e.g., wave refractions, reflections, and resonances), as well as to facilitate the processing of near-field signals (i.e., signals originating from a source whose distance from the sensors is not significantly (e.g., orders of magnitude) larger than the spatial extent of the sensor array).

Implementing array signal processing involves, in accordance with some embodiments, fusing the signals received by the individual sensors of the array for a plurality of putative source locations within a predefined two-dimensional region (that, e.g., spans a certain length in the depth direction and extends to a certain radial distance from the borehole) to thereby compute a two-dimensional map of an acoustic-source energy level, amplitude, or other fused-signal parameter as a function of depth and radial distance. The actual source location(s) can be determined from this map by identifying the local maximum (or multiple local maxima) of the acoustic source energy level or other parameter. The magnitude of the local maximum can be used to infer whether the identified acoustic source indeed corresponds to an underground flow. For instance, in some embodiments, acoustic signals are acquired under multiple flow and non-flow conditions to establish a statistical detection threshold for flows for use in a binary-hypothesis test or similar statistical test.

Figure 1:
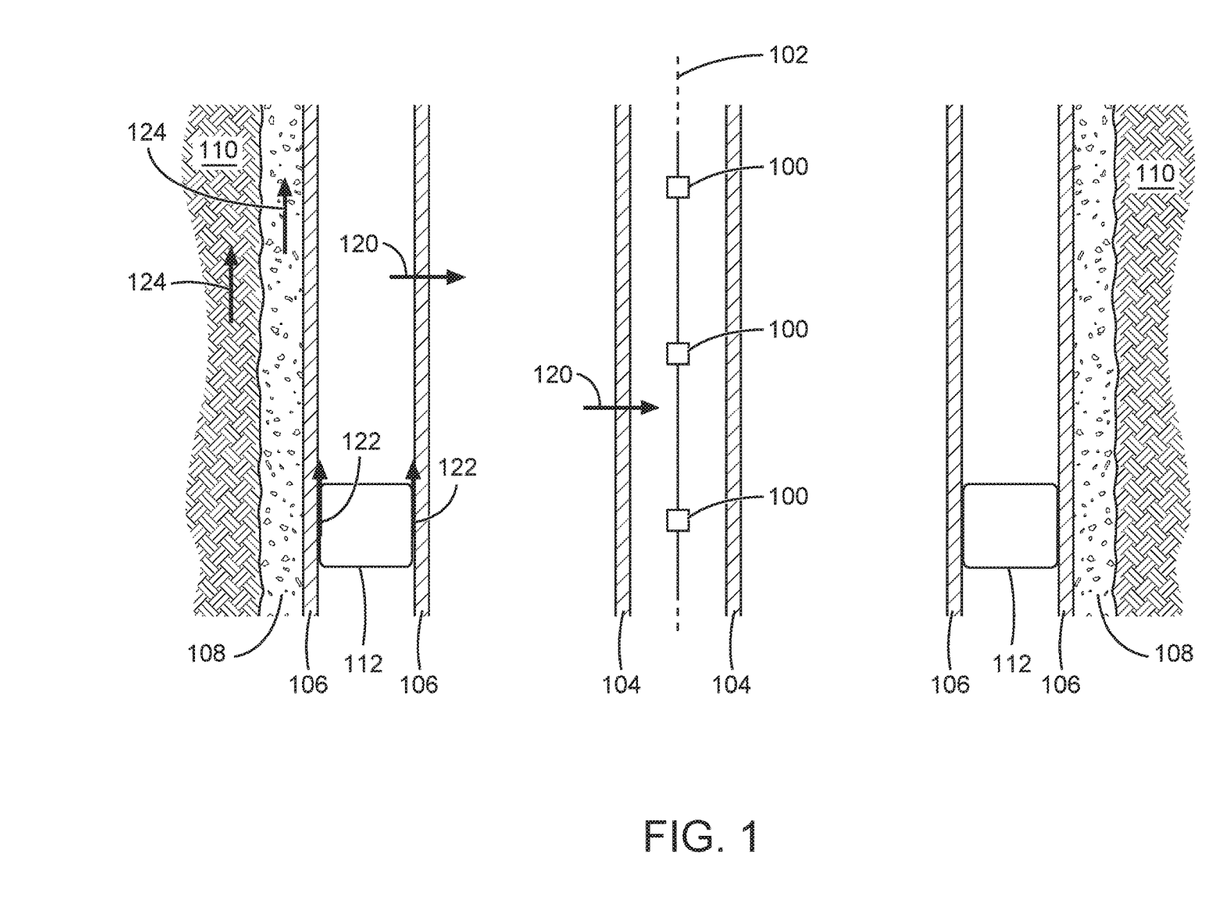
FIG. 1 is a schematic cross-sectional depiction of an example acoustic-sensor array deployed within a wellbore, in accordance with various embodiments.

FIG. 1 illustrates an example acoustic-sensor array deployed within a wellbore, in accordance with various embodiments. As shown, the sensors 100 may be arranged linearly along the longitudinal axis 102 of the wellbore (whose radial coordinate is zero). They may be uniformly spaced (as shown), or have varying spacings between adjacent sensors. The sensor environment generally includes multiple physical barriers to fluid flow, such as the production tubing 104 through which oil or gas may be pumped up and out of the well, one or optionally multiple nested well casings 106, and a cement sheath 108 filling the space between the casing(s) 106 and the formation 110 surrounding the wellbore. Additionally, the wellbore may be divided into multiple vertical sections, e.g., by packers 112 between the casings 106 that may separate, e.g., a lower, perforated portion of the tubing where hydrocarbons enter from an upper (non-perforated) portion serving as an upward conduit. Unintended flow scenarios that can occur in such a configuration include, e.g., flows across the casing 106 or tubing 104 due to cracks or holes therein (indicated by arrows 120), flows past a packer 112 between adjacent vertical wellbore sections due to insufficient sealing (indicated by arrows 122), and flows within the formation 110, cement sheath 108, or other layer more or less parallel to the layer boundaries (indicated by arrows 124). As these flows pass through restricted paths, acoustic signals can be generated as a result of the accompanying pressure drops. The acoustic signals propagate generally in all direction through the formation and/or wellbore, eventually being detected at the various sensor locations.

Acoustic sensors suitable for use in embodiments hereof include, for example and without limitation, (piezoelectric) hydrophones, FBG sensors, or segments of a distributed fiber-optic cable. In various embodiments, the acoustic sensors are omnidirectional, unable to discriminate by themselves between different incoming directions of the signal. By exploiting the spatiotemporal relations between the signals received from the same source at multiple sensors, however, information about the signal direction and/or source location can be obtained. For example, by using at least three sensors in a linear arrangement along the wellbore axis, as shown in FIG. 1, it is possible, at least under certain conditions, to determine the depth and radial distance of the source (as further explained below). To further localize the source in the azimuthal direction, the configuration of the sensor array may be modified, e.g., by placing different sensors at different radial positions or otherwise arrange them two- or three-dimensionally, by partially shielding sensors to limit their detection to certain azimuthal windows (different ones for different sensors), or by using directional sensors (i.e., sensors that inherently provide directional information). (As a practical matter, a linear configuration as shown in FIG. 1 may be the consequence of the spatial confines imposed by the tubing 104 in which the sensors are mounted.)

Figure 2:
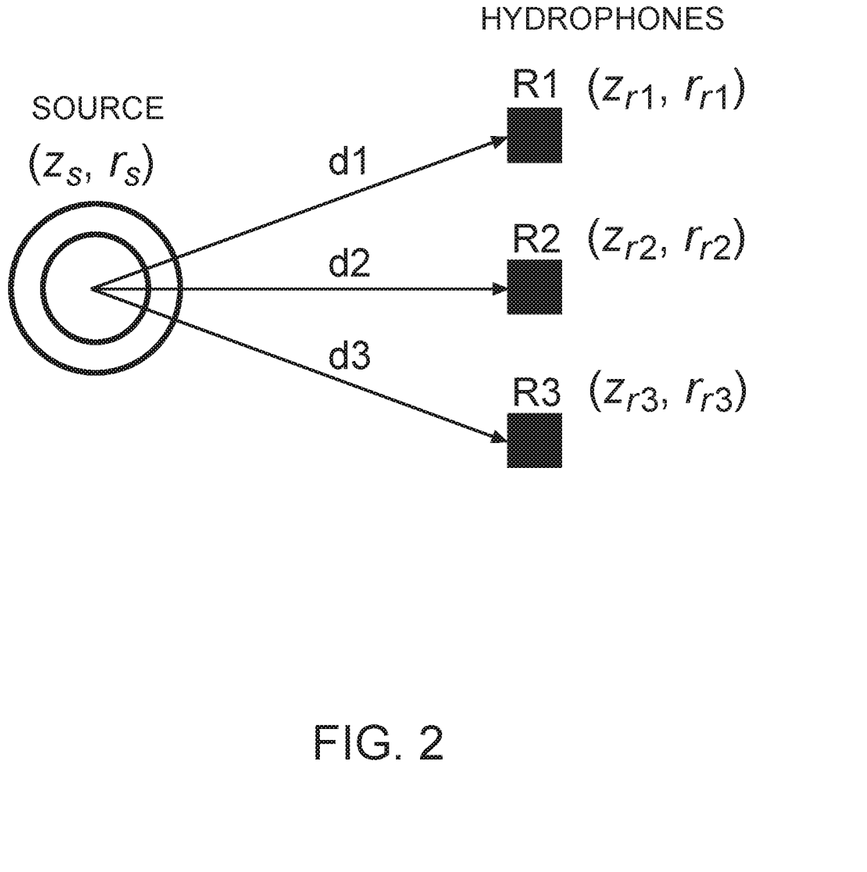
FIG. 2 is a schematic depiction of the relative locations of a source and three sensors, illustrating conceptually how an acoustic source can be located in two dimensions, in accordance with various embodiments.

FIG. 2 illustrates, at a high conceptual level, how an acoustic source can be located in two dimensions (e.g., radial distance r and depth z) based on the signals received simultaneously at three or more sensor locations R1, R2, R3, provided the medium is uniform such that the signal travels from the source to the sensors along straight lines (without undergoing, e.g., refraction or reflection) and at a known, constant speed of sound v. In this case, the travel time $t_i$ of the signal from the source at $(r_s, z_s)$ to a sensor i at $(r_{r,i}, z_{r,i})$ is simply the ratio of the distance $d_i$ between source and sensor to the speed of sound v:

$$t_i = \frac{d_i}{v} = \frac{\sqrt{(r_s - r_{r,i})^2 + (z_s - z_{r,i})^2}}{v}.$$

As will be readily appreciated by those of ordinary skill in the art, the absolute travel time $t_i$ cannot be measured in the passive flow-detection methods described herein because the acoustic signal does not have a known starting point in time (as the flow typically commences long before the measurements take place and, in any case, at an unknown time). However, the time delay $\Delta t_{ij} = t_i - t_j$ (corresponding to the relative phase shift) between the receipt of a certain signal feature (e.g., a peak in the temporal wave form) at a sensor i and receipt of the same feature at a sensor j can in principle be determined. With known sensor locations and a known speed of sound v, this time delay yields a nonlinear equation containing two unknowns, namely the coordinates $(r_s, z_s)$ of the source:

$$\Delta t_{ij} = t_i - t_j = \frac{\sqrt{(r_s - r_{r,i})^2 + (z_s - z_{r,i})^2} - \sqrt{(r_s - r_{r,j})^2 + (z_s - z_{r,j})^2}}{v}.$$

A second time delay measured between one of the sensors i, j and the third sensor k provides a second, independent nonlinear equation. From these two equations, the two-dimensional source location can be calculated straightforwardly in a manner known to those of ordinary skill in the art. If the speed of sound v is unknown and/or changes as the signal propagates through different media, an array with a larger number of sensors (e.g., four or more sensors) may be used to provide sufficient information to localize the source.

Figure 3:
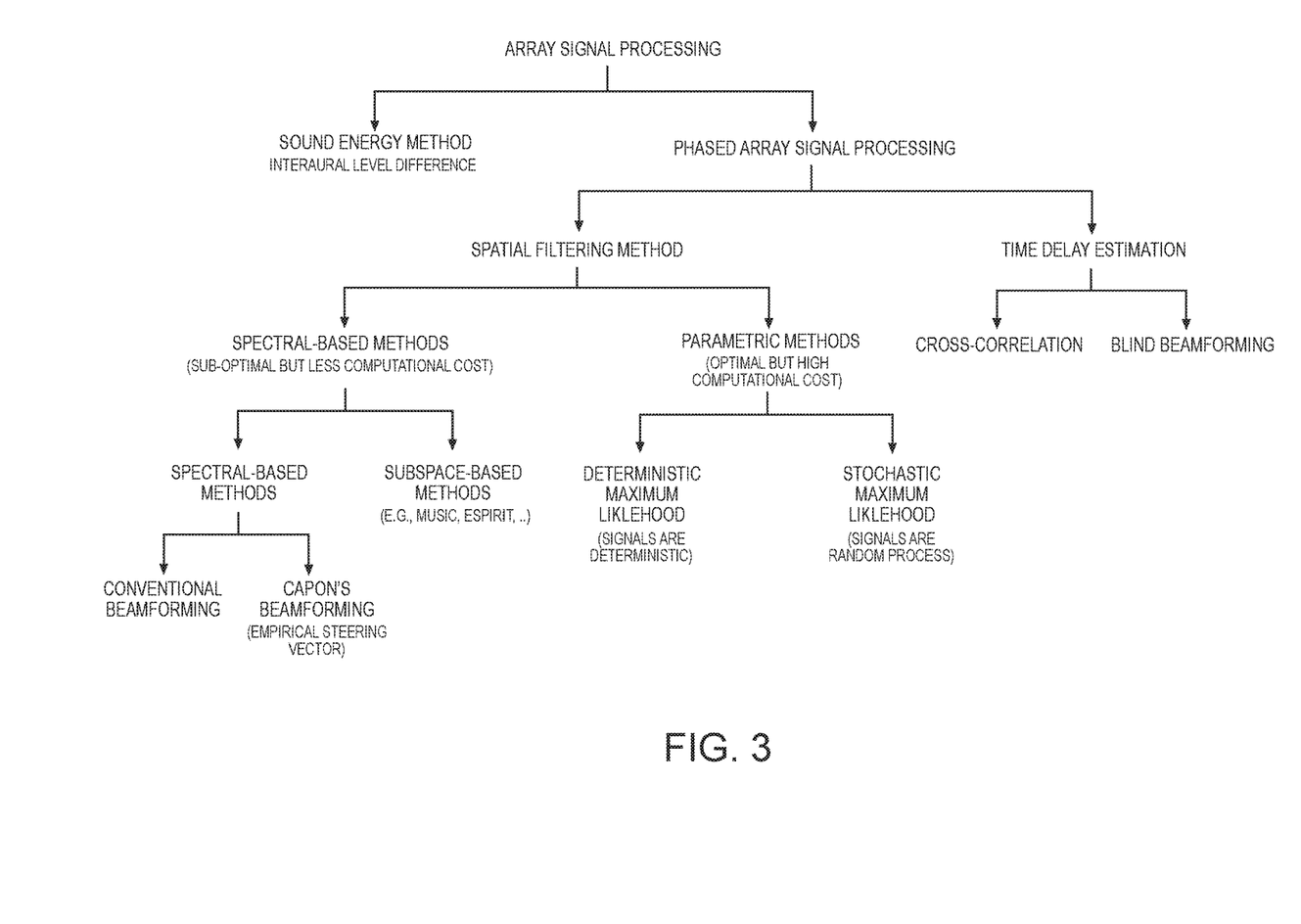
FIG. 3 is a chart of various array-signal-processing methods in accordance with various embodiments.

In the more complex scenarios typically encountered in flow-detection applications as contemplated herein, signal processing generally takes a more complex form. In various embodiments, an array-signal-processing method (such as spatial filtering) is employed to fuse the various simultaneously acquired sensor signals and localize the acoustic source. FIG. 3 provides an overview of various possible array-signal-processing techniques.

Figure 4:
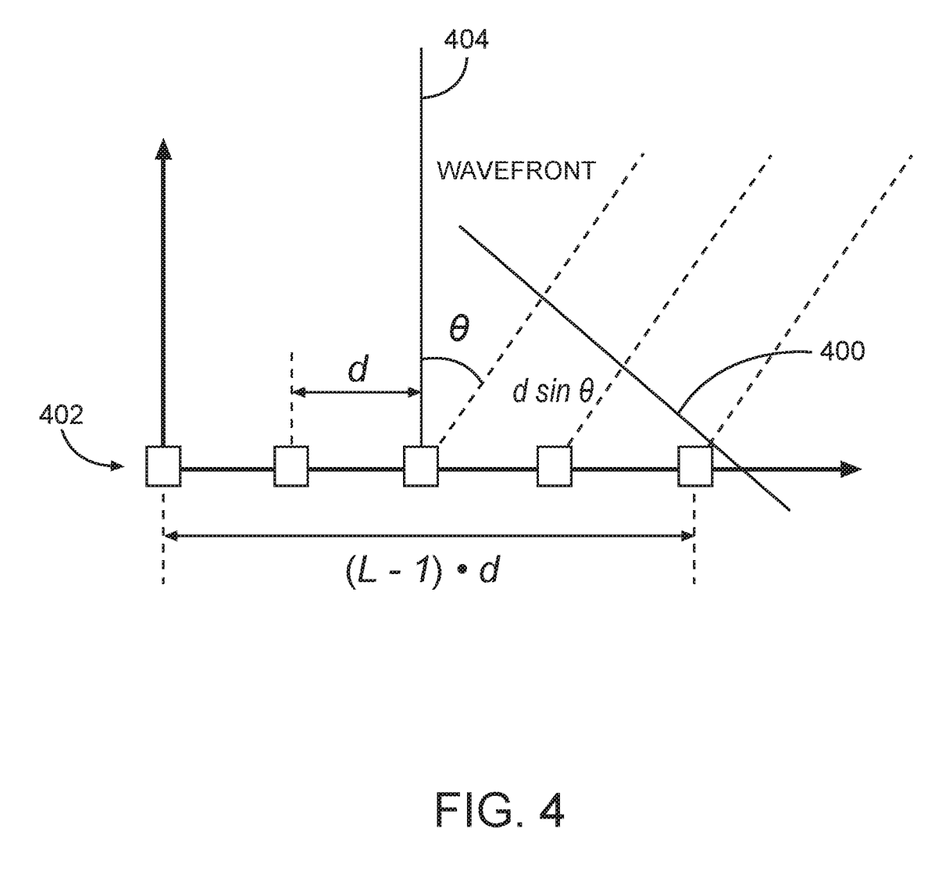
FIG. 4 is a schematic diagram of a planar wavefront impinging on a linear acoustic sensor array, illustrating receipt of a far-field acoustic signal.

To illustrate the principle underlying spatial filtering methods, consider a narrowband, far-field acoustic source s(t). FIG. 4 is a schematic diagram of a planar wave 400 impinging on a linear acoustic sensor array 402, as may be received from such a far-field source. The acoustic waves emitted from the source impinge on the linear array 402 at an angle θ with respect to the normal 404 to the array, such that the sensors within the array 402 measure signals (expressed as a vector X(t)):

$$X(t) = a(\theta)s(t) + n(t),$$

where a(θ) is a complex-valued vector expressing the amplitude attenuation and phase shift undergone by the signal on its path from the source to the respective sensors, and n(t) is a vector expressing the contribution of noise. Conversely, an unknown source signal can be estimated by fusing the measured signals, in accordance with:

$$y(t) = \frac{1}{L}\sum_{i=1}^{L} a_i(\theta) \cdot x_i(t) = \frac{a^H(\theta)}{L} X(t),$$

where L is the number of sensors and the superscript H denotes the conjugate transpose (i.e., the Hermitian). The vector a(θ) encapsulates the forward model of phase propagation, and is often referred to as the steering vector. In the simple case of a uniform medium in which the waves travel at a constant speed of sound c, with a wave vector k=ω/c, a(θ) takes the form:

$$a(\theta) = [1\, e^{-ikd\sin\theta}\, \ldots\, e^{-i(L-1)kd\sin\theta}]^T,$$

where d is the distance between adjacent sensors of a uniform array.

More generally, array signal processing involves expressing the fused signal y(t) as a weighted linear combination of the measured signals, $$y(t) = \sum_{i=1}^{L} w_i^* x_i(t) = w^H X(t),$$

and determining the complex-valued weight vector w based on a suitable heuristic. For example, in conventional beamforming, the weights are selected to maximize the output power of the fused signal at a given incident angle θ:

$$P(w) = \frac{1}{N}\sum_{i=1}^{N}|y(t)|^2 = \frac{1}{N}\sum_{i=1}^{N} w^H X(t) X^H(t) w = w^H \hat{R} w,$$

where $\hat{R}$ is the sample covariance matrix $$\hat{R} = \frac{1}{N}\sum_{i=1}^{N} X(t) X^H(t).$$

The resulting optimization problem takes the form $$\max_{w} E\{w^H X(t) X^H(t) w\} = \max_{w}\{E[|s(t)|^2] \cdot |w^H a(\theta)|^2 + w^H C_n w\}$$

subject to the constraint, |w|=1. The non-trivial solution to this problem is:

$$w = \frac{a(\theta)}{a^H(\theta) a(\theta)} = \frac{a(\theta)}{L}.$$

As another example, in Capon's beamforming method, the optimization problem takes the form $$\min_{w} E\{w^H X(t) X^H(t) w\} = \min_{w}\{E[|s(t)|^2] \cdot |w^H a(\theta)|^2 + w^H C_n w\}$$

subject to the constraint $|w^H a(\theta)| = 1$. This method fixes the gain at the incident angle θ and minimizes the noise contribution. The solution is:

$$w = \frac{\hat{R}^{-1} a(\theta)}{a^H(\theta) \hat{R}^{-1} a(\theta)}.$$

As can be seen, Capon's method incorporates the data (reflected in the sample covariance matrix $\hat{R}$) with the a-priori known forward model, and is thus one example of so-called "adaptive" spatial filtering methods. Additional methods (e.g., as summarized in FIG. 3) are known to those of ordinary skill in the art.

The above-described spatial-filtering methods apply under the assumption that the source signal is far away from the sensor array (far-field assumption) such that the time delays of individual sensors are a function of the incident angle θ only. To process near-field signals and further to include the effects of different media between the source and sensor array (e.g., as depicted in FIG. 1), the steering vector a(θ) is suitably modified, in accordance with various embodiments, to become a function $a(\theta, r_{spherical})$ of θ and the range $r_{spherical}$ of the source, i.e., the distance of the source from the sensor in spherical coordinates (which differs from the perpendicular radial distance of the source from the wellbore axis). The modified steering vector a (θ, $r_{spherical}$) may depend on a configuration and condition of the wellbore and surrounding formation, taking into account, e.g., the geometry and material properties of various layers and their effect on sound propagation (e.g., the resulting sound velocities in rock, mud, cement, etc.). Further, to process broadband signals, the measured signals are divided into narrow spectral bands, and following processing of the narrowband signals, the results are combined in manners well-known to those of ordinary skill in the art.

Accordingly, in various embodiments, the set of acoustic signals measured at the plurality of sensors is processed by "scanning" a two-dimensional region of interest (along depth z and radial distance r) for possible source locations by computing, for each of a plurality of "putative" source locations (e.g., characterized by θ and $r_{spherical}$, which can both be straightforwardly computed from the radial distance r and the depth z, relative to the sensor location), the fused signal y(t), using a suitable array-signal processing method (such as, e.g., conventional or Capon's beamforming).

Figure 5:
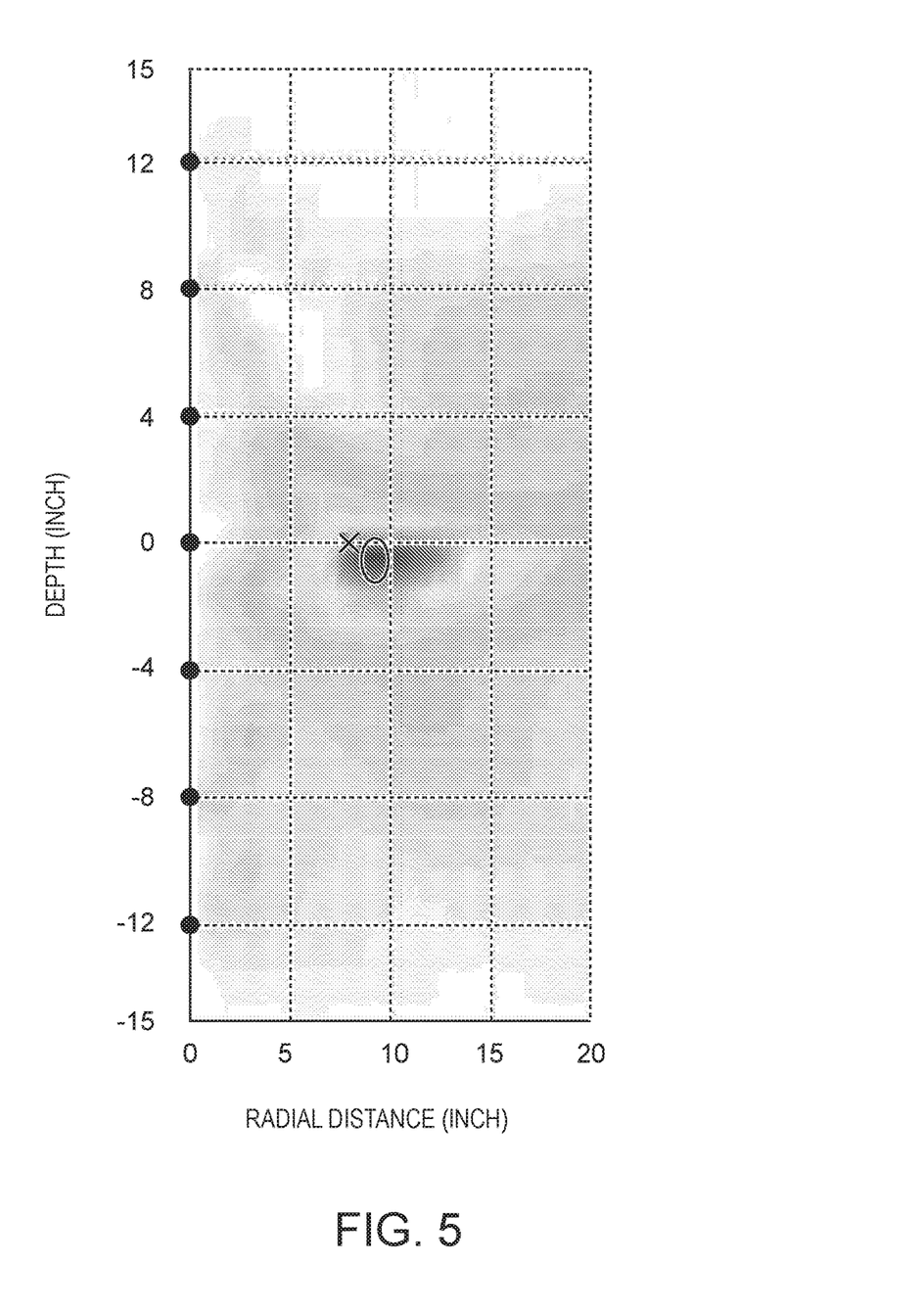
FIG. 5 is an example map of an acoustic-source energy level as a function of depth and radial distance, determined from a fused acoustic signal by array signal processing in accordance with various embodiments.

FIG. 5 illustrates, in the form of a two-dimensional map, an example result of such processing for a sensor array including seven uniformly spaced sensors, indicated by the dots on the depth axis, and an acoustic source at the location of the cross. The grey-scale value of the map indicates the energy level of the fused signal, i.e., the acoustic-source energy level, as calculated by array signal processing, at the putative locations. As can be seen, the computed energy level peaks in the vicinity of the actual acoustic source location. In the absence of a significant acoustic signal source, the map will show only low energy levels. In the case of multiple acoustic sources, the map will show high energy levels at multiple locations. Accordingly, acoustic-signal detection and processing in accordance herewith may facilitate simultaneously detecting multiple flows.

In various embodiments, statistical methods are employed to detect underground flows based on fused acoustic signal maps (such as that depicted in FIG. 5) by discriminating between flow and non-flow scenarios. For this purpose, a library of fused signals for various non-flow scenarios and a library of fused signals for various flow scenarios (including, e.g., different types of flows, such as oil, gas, and water flows, and different flow rates or other flow parameters) may be established. The data for non-flow scenarios may be collected from historical logging data or during flow-detection logging in real time in situations where the absence of a flow can reasonably be assumed, e.g., logging in a newly completed well. The data for flow scenarios may be collected from logging data of confirmed flow cases, such as leaks through casing. From the libraries, a suitable flow-detection threshold for a binary hypothesis test or similar statistical test may be derived.

Figure 6:
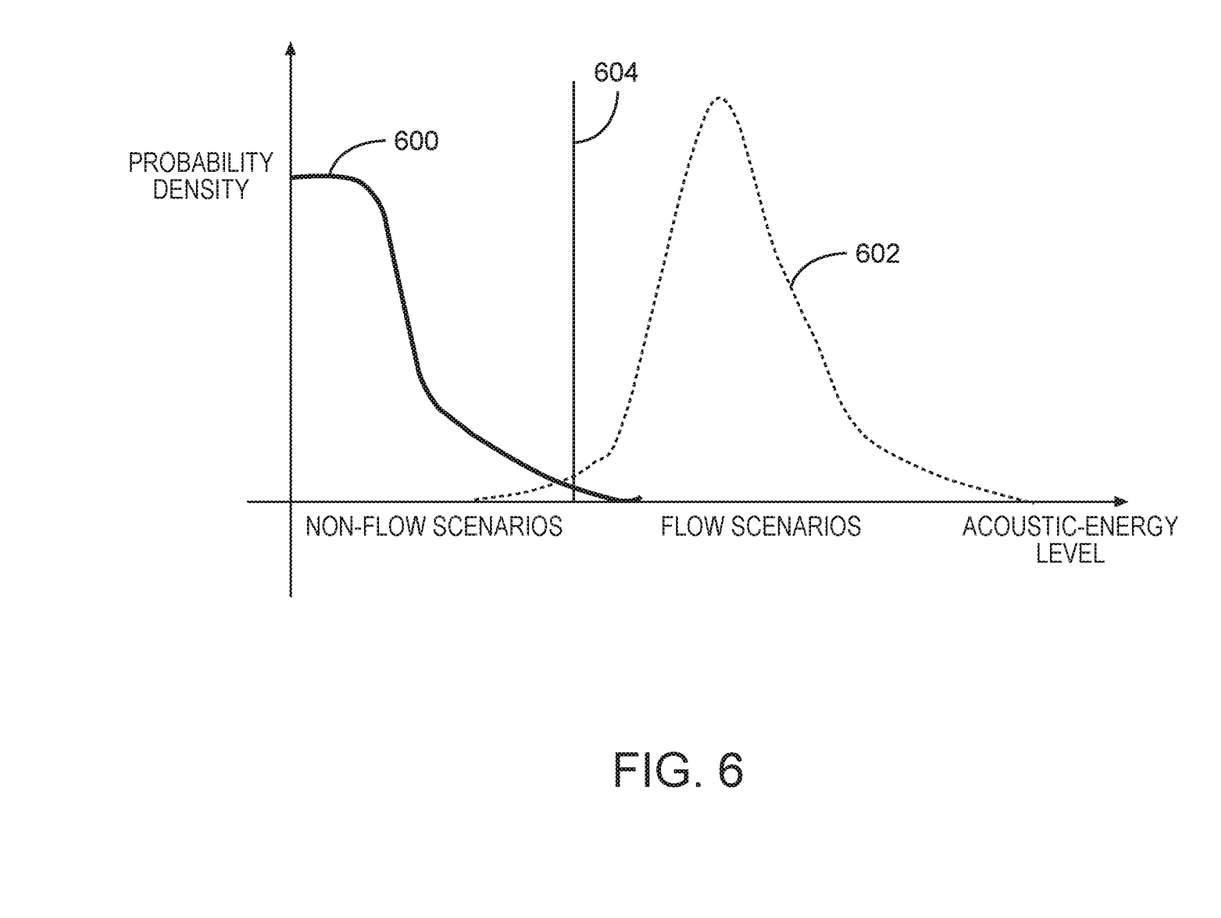
FIG. 6 is a graph of probability densities for flow and non-flow scenarios, illustrating a binary hypothesis test for flow detection, in accordance with various embodiments.

FIG. 6 illustrates the binary-hypothesis test with example probability distributions for non-flow and flow scenarios as a function of the acoustic source energy level (of a local maximum in a two-dimensional map, e.g., as shown in FIG. 5). Integrating the non-flow curve 600 from zero to a specified energy level yields the cumulative probability that, if there is no flow, the energy level of the fused signal falls below the specified energy level. Similarly, integrating the flow curve 602 from zero to a specified energy level yields the cumulative probability that, if there is flow, the energy level of the fused signal falls below the specified energy level. As shown, the acoustic energy level tends to be higher under flow conditions; however, there may be some overlap in the energy levels that correspond to flow and non-flow scenarios. A detection threshold 604 may be set in this overlap region, e.g., based on statistical metrics such as a false-alarm rate. Applying the binary-hypothesis test, if a measured signal level exceeds the threshold 604, a flow condition is assumed to exist. If the signal falls below the threshold 604, it is assumed that there is no flow. Integrating the flow curve 602 from the detection threshold 604 to infinity yields the sensitivity (probability of true positives) of the test, whereas integrating the flow curve 602 from zero to the detection threshold 604 yields the probability for missed flows (false negatives). Integrating the non-flow curve 600 from zero to the detection threshold 604 yields the specificity (probability of true negatives) of the test, whereas integrating the non-flow curve 600 from the detection threshold 604 to infinity yields the false-alarm probability (false positives).

Figure 7:
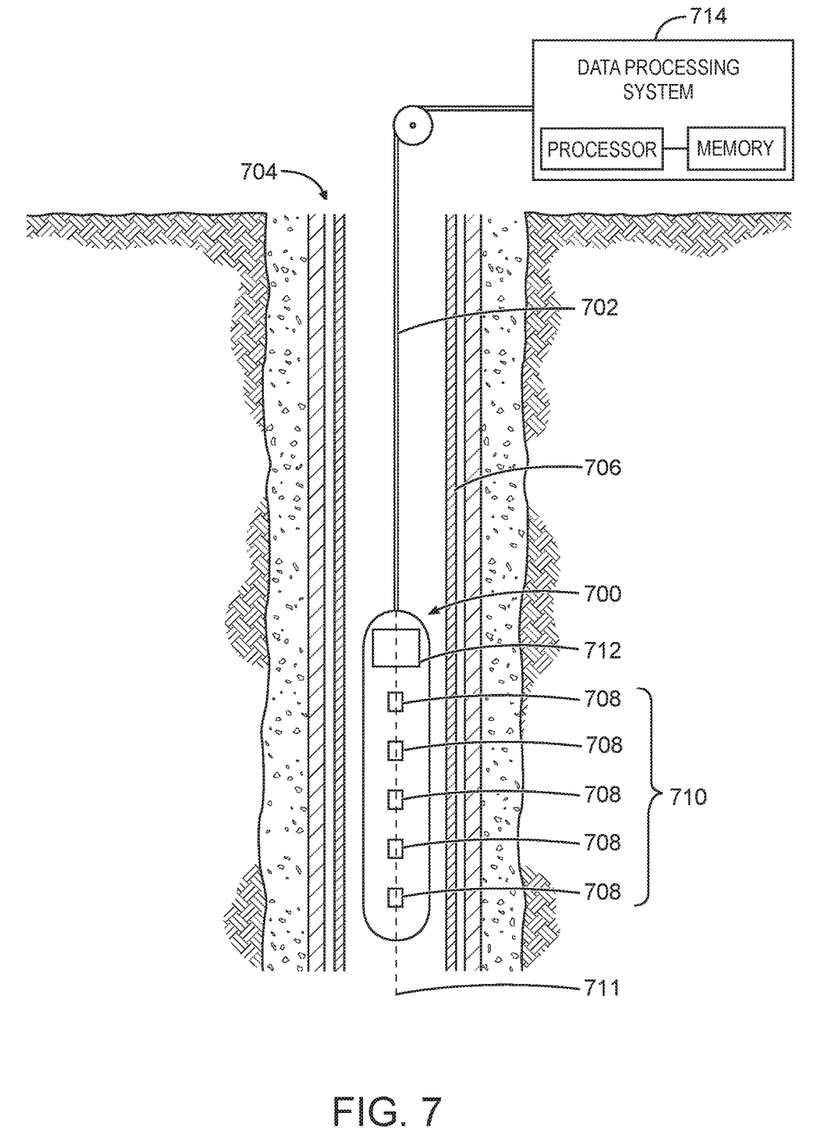
FIG. 7 is a schematic diagram of an example system for acoustic-source detection and localization in a wireline well-logging embodiment.

The detection and localization of underground acoustic sources (and, thus, underground flows) in accordance herewith can be implemented in both wireline logging and logging-while-drilling (LWD) operations. FIG. 7 illustrates an example wireline well-logging system. The system includes a sonde tool 700 suspended from a wireline 702 inside a cased wellbore 704. In various embodiments, the tool 700 is used inside the production tubing 706 through which hydrocarbons are pumped out of the wellbore 704. The tool 700 includes a plurality of (at least three) acoustic sensors 708 (such as, e.g., hydrophones), e.g., arranged in a linear array 710 along a longitudinal axis 711 of the tool 700 and, thus, of the wellbore 704. Further, the tool may include suitable control and processing circuitry 712, which may, in turn, be in communication (e.g., via a wired connection or a telemetry system) with a surface data-processing system 714. The data-processing facility providing the computational functionality for processing and fusing the acoustic signals received by the individual sensors 708 and detecting and localizing flows based thereon may be implemented by either one of the control and processing circuitry 712 or the data-processing system 714, or by both in combination. For example, in some embodiments, the control and processing circuitry 712 pre-processes the individual sensor signals (e.g., through signal conditioning, filtering, and/or noise cancellation) and transmits them to the surface data-processing system 714, where the fused signal map is computed, and any flow-induced acoustic sources are detected and localized based thereon. Each of the control and processing circuitry 712 and the surface data-processing system 714 may generally be implemented in hardware, software, or a combination thereof, such as with special-purpose circuitry (e.g., a digital signal processor, field-programmable gate-array, etc.) or a suitably programmed general-purpose computer including, e.g., a processor and associated memory (as shown in FIG. 7). In various embodiments, the processed acoustic signals are evaluated in conjunction with measurements from other sensors (e.g., temperature and surface well pressure measurements) to evaluate flow conditions and overall well integrity.

Alternative sensor configurations may be employed to support acoustic-source detection in a wireline logging operation. For example, in some embodiments, a distributed fiber optic cable is used in place of acoustic point sensors. The fiber optic cable can be permanently installed in the wellbore, e.g., clamped behind the casing or embedded in the cemented annulus. A channel, corresponding to a segment of the fiber-optic cable, can be scanned optically to detect surrounding acoustic signals. In this configuration, different channels at different depths correspond to different acoustic sensors.

Using a wireline logging tool 700, the acoustic sensor array 710 can search, at a given depth of logging, a predefined two-dimensional space, for example, the array aperture length in the depth direction and a few feet into the formation in the radial direction. This search can be repeated as the array 710 moves to another depth of logging. Thus, within one pass of wireline logging, a region spanning the entire length of the wellbore 704 can be searched for flow-induced acoustic sources. In some embodiments, the acoustic sensor array 710 is operated in a fast logging speed (e.g., at as much as 60 feet per minute) to detect flows initially with coarse spatial resolution. Once one or more flows have been detected at certain depths, regions at those depths can be re-logged at a slower logging speed, or in stationary mode, to localize the flow(s) at a finer spatial resolution. In embodiments where an acoustic signal is emitted along an extended path (as opposed to from a point source), the whole flow path may be mapped out in a two-dimensional space of depth and radial distance.

Figure 8:
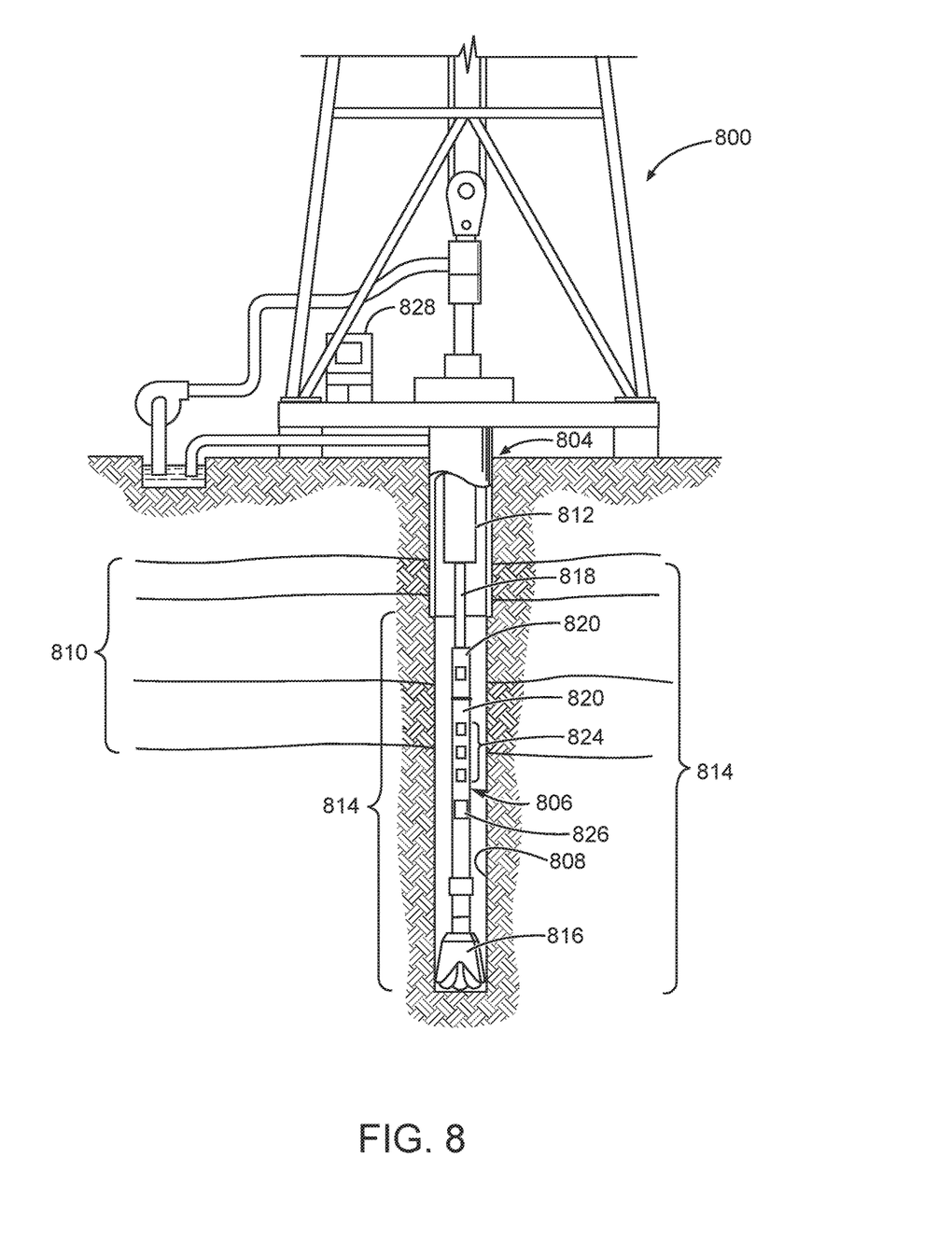
FIG. 8 is a schematic diagram of an example system for acoustic-source detection and localization in a logging-while-drilling embodiment.

Turning now to FIG. 8, it can be seen that a system for detecting and localizing underground acoustic sources can also be implemented in a drilling system for LWD operations. This may be useful, e.g., to detect flows for the purpose of characterizing the formation and hydrocarbon reservoirs, and steer or otherwise adjust drilling based thereon. As shown, the drilling system includes a drilling rig 800 located at the surface of a well 804 and, supported by the drilling rig 800, a drill string 806 for drilling a wellbore 808 through subsurface formations 810. The drill string 806 includes a drill pipe 812 and, generally located at the lower end of the drill pipe 812, a bottom hole assembly (BHA) 814. The BHA 814 may include the drill bit 816 and, disposed thereabove, one or more drill collars 818, 820, which may contain a number of different tools and instruments adapted for taking measurements during the drilling process. In accordance with various embodiments, these tool may include an acoustic sensor array 824 (e.g., including three or more linearly arranged sensors) and associated control and processing circuitry 826, and may be in communication with a surface data-processing system 828. Each of the control and processing circuitry 826 and the surface data-processing system 828 may generally be implemented in hardware, software, or a combination thereof, such as with special-purpose circuitry or a suitably programmed general-purpose computer. Collectively, the acoustic sensor array 824 and the control and processing circuitry 826 and/or data-processing system 828 provide functionality for implementing the above-described methods.

Figure 9:
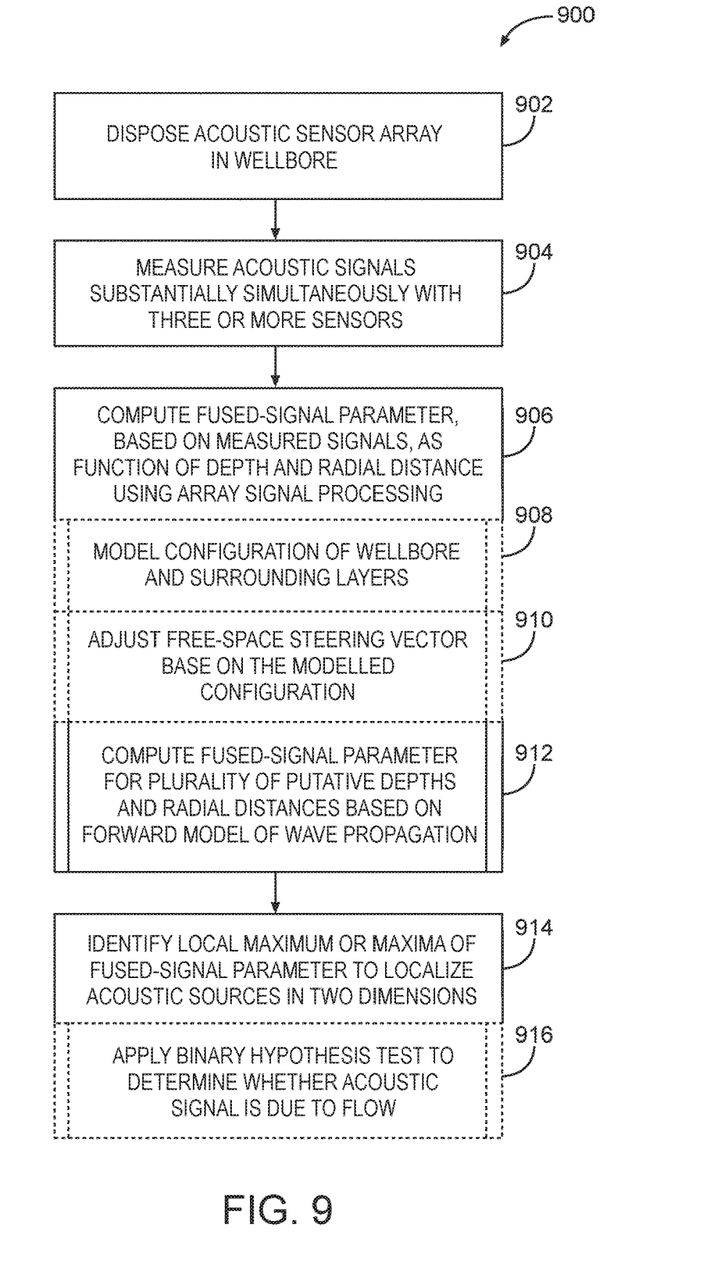
FIG. 9 is a flow chart of example methods for acoustic-source detection and localization in accordance with various embodiments.

FIG. 9 is a flow chart of an example method 900 for acoustic-source detection and localization in accordance with various embodiments. The method 900 involves disposing an array of acoustic sensors in a wellbore, e.g., as part of a sonde tool 700 on a wireline or as part of a BHA 814 on a drill string. Further, the method involves measuring acoustic signals substantially simultaneously with three or more sensors of the array (act 904). The measured signals are then processed, using a suitable array signal processing techniques (e.g., conventional beamforming Capon's beamforming as described in detail above), to compute a fused-signal parameter (e.g., an acoustic source energy level) as a function of depth in the wellbore and radial distance from the wellbore (or, more generally, in at least two dimensions) (act 906). Computing the fused-signal parameter may involve, in some embodiments, modelling the configuration of the wellbore and surrounding layers (including pipe, casing, cement sheath, and formation layers) (act 908) and adjusting the free-space steering vector steering vector based on the modelled configuration (act 910) to properly account for potential near-field acoustic sources and/or non-uniform media between the acoustic source(s) and the acoustic sensors. The configuration of the wellbore and its surroundings may allow for variations in material properties (such as, e.g., the velocity of sound) in one, two, or three dimensions. For example, in on comparatively simple scenario, the material properties are assumed to be constant in the depth and azimuthal directions, but to vary in the radial direction, resulting in multiple circumferential layers of different properties in and around the borehole. Using a forward model of wave propagation created based on the (free-space or adjusted) steering vector, the fused-signal parameter is computed for a plurality of putative depths and radial distances (act 912), resulting in a two-dimensional map, e.g., as depicted in FIG. 5. From this map, one or more local maxima of the fused-signal parameter may then be identified to locate the acoustic source(s) in depth and radial distance (act 914). In certain embodiments, the fused-signal parameter is computed additionally as a function of azimuthal position, allowing acoustic sources to be located in three dimensions (e.g., depth, radial distance, and azimuth). In some embodiments, a binary hypothesis test, e.g., as described with respect to FIG. 6, is applied to each identified local maximum to determine whether it, indeed, corresponds to an acoustic source resulting from flow (act 916). For example, the acoustic energy level (or other fused-signal parameter) of an identified local maximum may be compared to a detection threshold, and only if it exceeds the threshold, the local maximum is deemed to belong to an acoustic source due to a flow condition.

Figure 10:
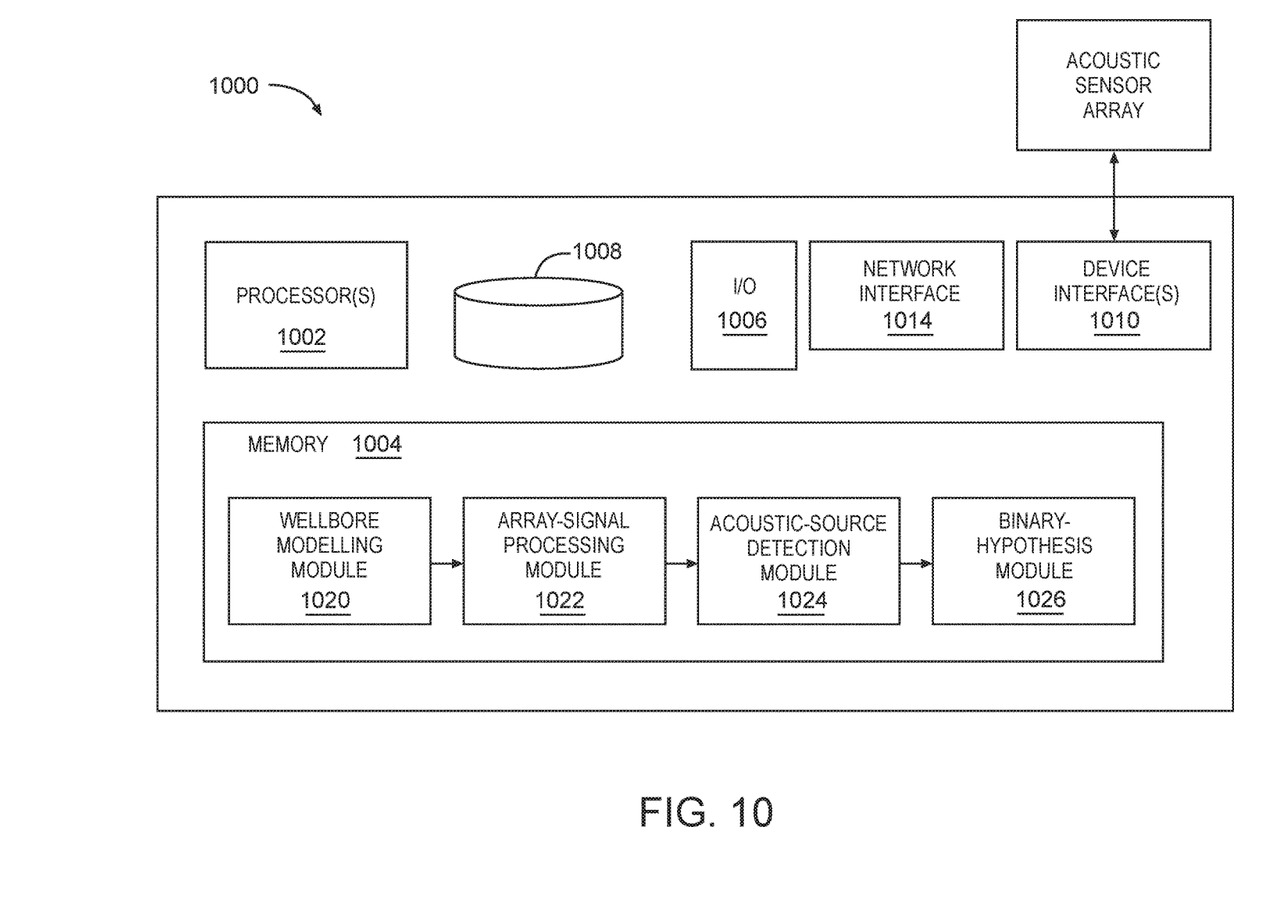
FIG. 10 is a block diagram of an example computing system for implementing the computational functionality of the method of FIG. 9, in accordance with various embodiments.

FIG. 10 is a block diagram of an example data-processing facility, in the form of a suitably programmed general-purposes computer (e.g., as may be implemented in the surface data-processing system 714), for implementing the computational functionality of the method of FIG. 9, in accordance with various embodiments. The data-processing facility 1000 includes one or more processors 1002 (e.g., a conventional central processing unit (CPU), graphical processing unit, or other) configured to execute software programs stored in memory 1004 (which may be, e.g., random-access memory (RAM), read-only memory (ROM), flash memory, etc.). Further, computing system 1000 may include user input/output devices 1006 (e.g., a screen, keyboard, mouse, etc.), permanent data-storage devices 1008 (including, e.g., solid-state, optical, and/or magnetic machine-readable media such as hard disks, CD-ROMs, DVD-ROMs, etc.), device interfaces 1010 for communicating directly or indirectly with the acoustic sensor array (e.g., array 710, 824), a network interface 1014 that facilitates communication with other computer systems and/or data repositories, and a system bus (not shown) through which the other components communicate.

The software programs stored in the memory 1004 include processor-executable instructions for performing the methods described herein, and may be implemented in any of various programming languages, for example and without limitation, C, C++, Object C, Pascal, Basic, Fortran, Matlab, and Python. The instructions may be grouped in various functional modules, e.g., for the purpose of re-use and sharing of the functionality of certain modules between other modules that utilize it. In accordance with the depicted embodiment, the modules include, for instance, a wellbore-modelling module 1020 for characterizing the wellbore and its surroundings and adjusting the free-space steering vector based thereon; an array-signal processing module 1022 for fusing the acoustic signals from multiple sensors to compute a fused-signal parameter map for a range of putative depths and radial distances; an acoustic-source detection module 1024 for identifying one or more local-maxima indicative of acoustic sources in the fused-signal parameter map; and binary-hypothesis module 1026 for applying a binary-hypothesis test to the detected maxima to determine whether they are due to flows. Of course, the depicted organization into modules is merely one non-limiting example of ways in which instructions that implement the disclosed functionality can be grouped.

The following numbered examples are illustrative embodiments:

1. A method comprising: substantially simultaneously measuring acoustic signals with each of at least three sensors disposed in an array within a wellbore; and processing the measured acoustic signals in combination, using an array signal processing technique, to determine a depth and radial distance from the wellbore of an acoustic source.

2. The method of example 1, wherein the array signal processing technique comprises at least one of spatial filtering, time delay estimation, or a sound-energy method.

3. The method of example 1 or example 2, wherein processing the measured acoustic signals comprises: computing a fused-signal parameter as a function of depth and radial distance from the wellbore; and identifying a local maximum of the fused-signal parameter, a depth and radial distance of the identified local maximum corresponding to the depth and radial distance of the acoustic source.

4. The method of example 3, wherein the fused-signal parameter comprises an acoustic source energy level.

5. The method of example 3 or example 4, further comprising detecting a flow based on a binary hypothesis test applied to the fused-signal parameter.

6. The method of any of examples 3-5, further comprising detecting a flow based on the local maximum of the fused-signal parameter exceeding a specified threshold, the threshold being based on statistical data for a plurality of flow and non-flow scenarios.

7. The method of any of examples 3-6, wherein computing the fused-signal parameter comprises, for each of a plurality of depths and radial distances, creating a forward model of wave propagation.

8. The method of example 7, wherein the forward model of wave propagation is based at least in part on a configuration or condition of the wellbore.

9. The method of example 7 or example 8, wherein determining the forward model of wave propagation comprises adjusting a free-space steering vector based on a configuration of the wellbore.

10. The method of any of examples 3-9, comprising identifying multiple local maxima of the fused-signal parameter, corresponding to multiple acoustic sources.

11. The method of any of examples 1-10, wherein the acoustic sensors comprise omnidirectional hydrophones, FBG sensors, or fiber-optic cables.

12. The method of any of examples 1-11, wherein the acoustic sensors form a linear array disposed along a longitudinal axis of the wellbore.

13. The method of any of examples 1-12, further comprising determining an azimuthal position of the acoustic source.

14. A system comprising: a sensor array disposed within a wellbore, comprising at least three acoustic sensors for substantially simultaneously measuring acoustic signals received thereat; and a data-processing facility configured to process the measured acoustic signals in combination, using an array signal processing technique, to determine a depth and radial distance from the wellbore of an acoustic source.

15. The system of example 14, wherein the array signal processing technique comprises at least one of spatial filtering, time-delay estimation, or a sound-energy method.

16. The system of example 14 or example 15, wherein the data-processing facility is configured to process the measured acoustic signals by: computing a fused-signal parameter as a function of depth and radial distance from the wellbore; and identifying a local maximum of the acoustic source energy level, a depth and radial distance of the identified local maximum corresponding to the depth and radial distance of the acoustic source.

17. The system of example 16, wherein the fused-signal parameter comprises an acoustic source energy level.

18. The system of example 16 or example 17, wherein the data-processing facility is further configured to determine whether the local maximum of the fused-signal parameter exceeds a specified threshold, such exceeding corresponding to detection of a flow.

19. The system of example 18, wherein the threshold is specified based on a plurality of flow and non-flow scenarios.

20. The system of any of examples 16-19, wherein the data-processing facility is configured to compute the fused signal based on a forward model of wave propagation.

21. The system of example 20, wherein the forward model of wave propagation is based at least in part on a configuration of the wellbore.

22. The system of any of examples 14-21, wherein the acoustic sensors comprise omnidirectional hydrophones, FBG sensors, or fiber-optic cables.

23. The system of any of examples 14-22, wherein the acoustic sensors form a linear array disposed along a longitudinal axis of the wellbore.

Many variations may be made in the systems, tools, and methods described and illustrated herein without departing from the scope of the inventive subject matter. Accordingly, the scope of the inventive subject matter is to be determined by the scope of the following claims and all additional claims supported by the present disclosure, and all equivalents of such claims.

What is claimed is:

1. A method, comprising:
substantially simultaneously measuring acoustic signals with each of at least three sensors disposed in an array within a wellbore;
using an array-processing technique to compute, from the measured acoustic signals, a fused-signal parameter as a function of depth and radial distance from the wellbore; and
determining a depth and radial distance from the wellbore of an acoustic source based on a local maximum of the fused-signal parameter.

2. The method of claim 1, further comprising using a binary hypothesis test applied to the local maximum of the fused-signal parameter to determine whether the acoustic source corresponds to an underground flow.

3. The method of claim 2, wherein the binary hypothesis test comprises a comparison of the local maximum against a detection threshold, flow being detected based on the local maximum of the fused-signal parameter exceeding the detection threshold, the threshold being based on empirical data for a plurality of flow and non-flow scenarios.

4. The method of claim 1, wherein the empirical data comprises fused-signal data derived from logging data for confirmed flow cases as well as in the absence of flow conditions.

5. The method of claim 4, wherein creating the forward model comprises modifying a free-space steering vector to account for non-uniformities in the configuration of the wellbore and surrounding formation.

6. The method of claim 4, wherein creating the forward model comprises modifying a free-space steering vector to account for the acoustic source being a near-field source.

7. The system of claim 6, wherein the binary hypothesis test comprises a comparison of the local maximum against a detection threshold, the data-processing facility to detect flow based on the local maximum of the fused-signal parameter exceeding the detection threshold, the threshold being based on empirical data for a plurality of flow and non-flow scenarios.

8. The method of claim 1, wherein the detection threshold is derived from the empirical data bases on one or statistical metrics comprising at least one of a sensitivity, a false-alarm rate, or a false-negatives rate.

9. The method of claim 8, wherein the non-uniformities comprise at least one of multiple barriers to fluid flow or multiple media between the acoustic source and the sensors.

10. The system of claim 9, wherein the data-processing facility is further to use a binary hypothesis test applied to the local maximum of the fused-signal parameter to determine whether the acoustic source corresponds to an underground flow.

11. The system of claim 9, wherein the data-processing facility, in computing the fused-signal parameter, is to create a forward model of acoustic wave propagation based at least in part on a configuration of the wellbore and surrounding formation, the configuration being modelled as non-uniform.

12. The system of claim 9, wherein the acoustic sensors comprise omnidirectional hydrophones, FBG sensors, or fiber-optic cables.

13. The system of claim 9, wherein the acoustic sensors form a linear array disposed along a longitudinal axis of the wellbore.

14. The method of claim 1, wherein computing the fused-signal parameter comprises creating a forward model of acoustic wave propagation based at least in part on a configuration of the wellbore and surrounding formation, the configuration being modelled as non-uniform.

15. A system comprising:
   a sensor array disposed within a wellbore, comprising at least three acoustic sensors for substantially simultaneously measuring acoustic signals received thereat; and
   a data-processing facility to use an array-processing technique to compute, from the measured acoustic signals, a fused-signal parameter as a function of depth and radial distance from the wellbore compute, and to determine a depth and radial distance from the wellbore of an acoustic source based on a local maximum of the fused-signal parameter.

16. The system of claim 15, wherein the empirical data comprises fused-signal data derived from logging data for confirmed flow cases as well as in the absence of flow conditions.

17. The system of claim 16, wherein the data-processing facility, in creating the forward model, is to modify a free-space steering vector to account for non-uniformities in the configuration of the wellbore and surrounding formation.

18. The system of claim 15, wherein the data-processing facility is to derive the detection threshold from the empirical data bases on one or statistical metrics comprising at least one of a sensitivity, a false-alarm rate, or a false-negatives rate.

19. The system of claim 18, wherein the non-uniformities comprise at least one of multiple barriers to fluid flow or multiple media between the acoustic source and the sensors.

20. The system of claim 18, wherein the data-processing facility, in creating the forward model, is to modify a free-space steering vector to account for the acoustic source being a near-field source.

* * * * *